United States Patent [19]

Dilworth

[11] 4,277,450

[45] Jul. 7, 1981

[54] REMOVAL OF SULFUR DIOXIDE FROM GAS

[75] Inventor: Louis R. Dilworth, Greendale, Wis.

[73] Assignee: Allis-Chalmers Corporation, Milwaukee, Wis.

[21] Appl. No.: 101,479

[22] Filed: Dec. 10, 1979

Related U.S. Application Data

[62] Division of Ser. No. 21,026, Mar. 16, 1979, Pat. No. 4,226,831.

[51] Int. Cl.³ .......................... B01J 8/00; C01B 17/00
[52] U.S. Cl. .................................................. 423/244
[58] Field of Search ............... 423/242 A, 242 R, 243, 423/244 A, 244 R, 210 S, 210 R

[56] References Cited

U.S. PATENT DOCUMENTS

| | | | |
|---|---|---|---|
| 3,851,042 | 11/1974 | Minnick | 423/244 |
| 4,018,868 | 4/1977 | Knight | 423/244 |
| 4,061,476 | 12/1977 | Holter et al. | 423/244 |
| 4,185,080 | 1/1980 | Rechmeir | 423/242 |

*Primary Examiner*—O. R. Vertiz
*Assistant Examiner*—Gregory A. Heller
*Attorney, Agent, or Firm*—James R. Custin; Arthur M. Streich

[57] ABSTRACT

Emission gas to be scrubbed of sulfur dioxide or the like has turbulent lengthwise flow through an elongated mixing vessel. At a mixing zone in the vessel, near where said gas enters it, finely comminuted lime (Blaine Number preferably 6000 before calcining) is fed into the gas and carried out of the vessel with the gas to a cyclone separator. From the cyclone the gas passes to a baghouse at which residual lime is removed from it and it is released. A minor portion of the lime separated at the cyclone is sent to waste; most is returned to the mixing zone for recycling. Make-up lime is fed to the mixing zone from a suspension calcining furnace, reaching the mixing zone while still heated. To maintain 650° C. to 750° C. at the mixing zone, recycled lime may be reheated in passing from the cyclone to that zone. The total of recycled and fresh lime fed to the mixing zone is at least nine times the quantity required for stoichiometric reaction with pollutant in the emission gas and can be 40 or more times that quantity.

10 Claims, 1 Drawing Figure

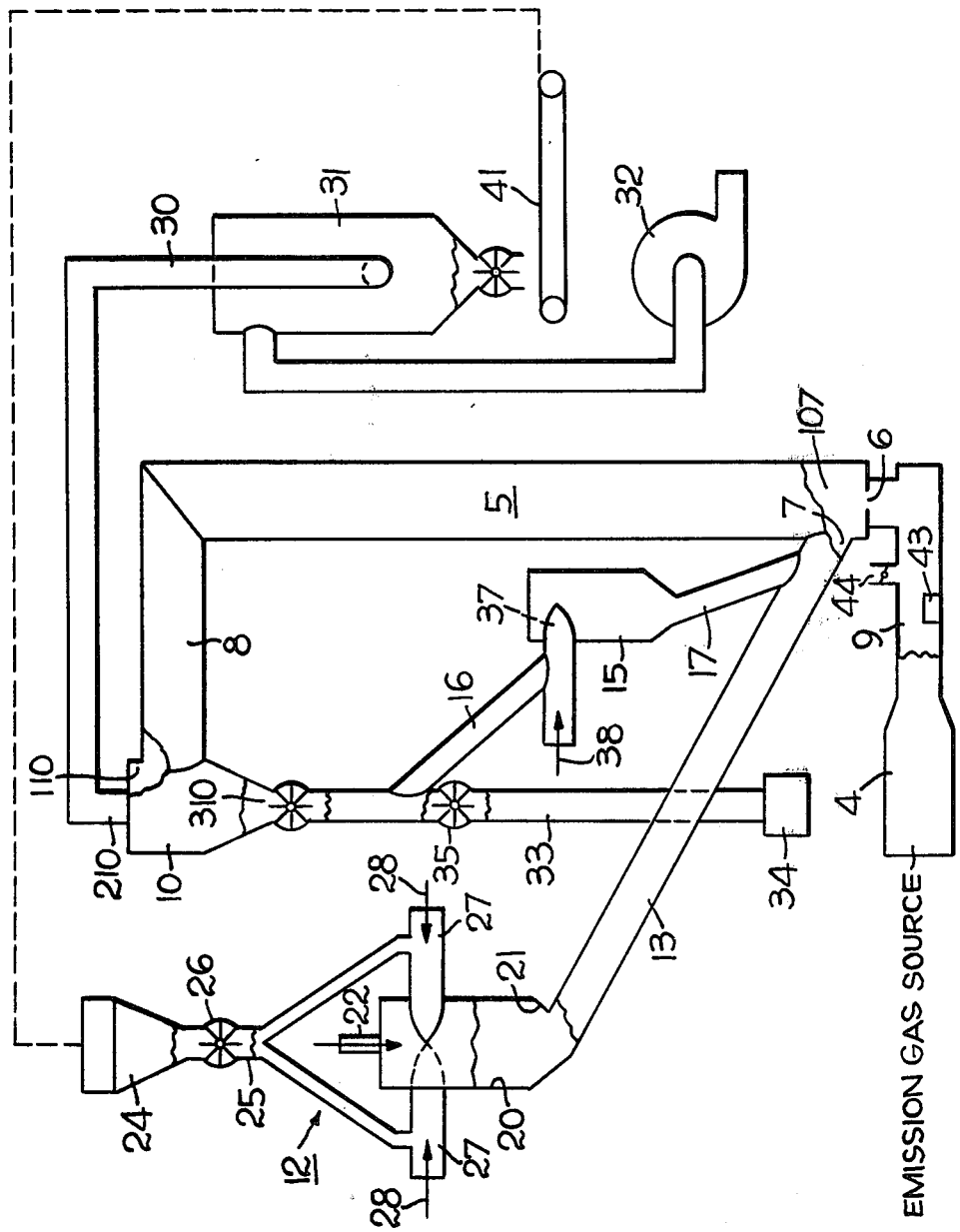

REMOVAL OF SULFUR DIOXIDE FROM GAS

This is a division of application Ser. No. 021,026, filed Mar. 16, 1979, now U.S. Pat. No. 4,226,831 dated Oct. 7, 1980.

FIELD OF THE INVENTION

This invention relates to a method and apparatus for scrubbing gases to cleanse them of sulfur, titanium oxide and/or phosphorous oxides; and the invention is more particularly concerned with a reliable and energy-efficient method and apparatus for dry gas scrubbing that utilizes a widely available and inexpensive adsorbing medium and converts it to a waste material that is dry and non-polluting.

BACKGROUND OF THE INVENTION

The scrubbing of stack gases and process gases to cleanse them of gaseous pollutants—mainly sulfur dioxide but in some cases phosphorous pentoxide—has heretofore been expensive both in operating costs and in capital investment for scrubbing apparatus. However, scrubbing is mandatory where gas to be emitted into the atmosphere contains more than specified negligible quantities of such pollutants.

In view of the increasing cost of energy and the need to conserve existing energy resources, a major consideration in evalulating the operating cost of any gas scrubbing system is its energy economy. But it is also of great importance that the waste material resulting from gas scrubbing be kept to a minimum because such material has little or no commercial value and in many cases substantial cost is entailed in disposing of it. It is also very important that the waste material from a gas scrubbing system be such as will not be a source of pollution in itself.

In one prior system for removal of sulfur from stack and process gases, now in widespread use, the gas to be scrubbed is passed through a slurry consisting of water and comminuted limestone (calcium carbonate) or a substance containing a substantial percentage of calcium carbonate. Although such a wet scrubbing system is satisfactorily effective in removing sulfur dioxide from gas to be scrubbed it has several very important disadvantages. A substantial amount of power is needed to force the gas through the slurry, and there is a further loss of otherwise available energy in cooling of the gas to be scrubbed as it passes through the slurry. The waste material from such a system is in the form of a wet sludge that must be dumped in an area where it can drain without causing possible pollution of ground waters and surface streams. Of course a wet-scrubbing system requires an adequate water supply, which may not be available in arid or semi-arid locations. Apparatus needed for wet scrubbing is high in first cost because it must be impervious to the sulfuric acid generated in the course of the adsorption reaction, and it is expensive to maintain because of a tendency for the wet material to form crusts and scales on the apparatus and to plug it from time to time. Constant skilled supervision is necessary; hence, there is a high operating cost for labor. Although the reliability of wet scrubbing systems has improved in the course of time, such systems are regarded as being, at best, somewhat unreliable and subject to unsatisfactorily frequent shut-down for repairs and maintenance.

In another prior type of gas scrubbing system, not yet in substantial commercial use, ground and hydrated (slaked) lime is mixed with water under heat and pressure to form a calcium hydroxide slurry that is sprayed into the gas to be scrubbed. The waste product of a spray system, being dry, is not as objectionable as that from a wet scrubber. But the hydrated lime that the system requires must be of relatively high quality. Furthermore, preparation of the hydrated lime entails the expenditure of a substantial amount of energy which cannot in any practical way be recovered for employment in the scrubbing operation and which should therefore be counted as part of the total energy cost of the system. In addition to being costly to operate and low in overall energy efficiency, a spray system requires complicated and costly apparatus and will probably be found to need close and constant supervision because it presents the possibility of crusting, plugging and corrosion.

Certain dry scrubbing processes have been proposed that employ catalytic materials. All such systems appear to require very complicated equipment that involves high capital and operating costs, and none of them has gone into substantial commercial use.

A gas scrubbing process has also been proposed that would employ dry sodium bicarbonate (so-called nahcolite) as the sulfur dioxide adsorbing medium. While that system is promising in theory, natural nahcolite is found only in limited geographical areas, where it lies in beds which have not yet been mined and which it is not feasible to exploit under present conditions.

Such other proposals as have come forward have at best provided only relatively minor reductions in the cost and difficulty of gas scrubbing. Efforts to solve the problem have been diligent and persistent. The urgency of the problem is well known because the cost of pollution control is widely recognized as a heavy but unavoidable burden upon the economy that yields no direct gain in productivity. It is evident, therefore, that any substantial breakthrough must result from something well beyond the application of mere skill in the art.

The present invention constitutes such a breakthrough. Its general object is to provide for scrubbing of stack and process gases with the use of a plentiful and inexpensive adsorbing medium by a process which consumes relatively little energy, can be practiced with simple, inexpensive and reliable apparatus and with a minimum of operating personnel, and produces a dry, non-polluting spent material.

It is also an object of this invention to provide a highly efficient but inexpensive and reliable method and apparatus for removing gaseous pollutants—such as sulfur and phosphorous oxides—from stack and process gases, whereby the pollutant content of such gases can be reduced from very high levels, on the order of thousands of parts per million, to very satisfactorily low levels, without incurring incidental pollution problems such as the addition of particulates to the discharged gases or the creation of a spent product that may become a source of water pollution.

Thus the principal object of the present invention is to provide a gas scrubbing system which as compared with prior commercially feasible gas scrubbing systems, has the several important advantages of: Lower capital cost, substantially lower energy consumption, capability for operating with less supervision and with much greater reliability, use of a readily available adsorbing medium, and production of a non-polluting spent product.

A more specific object of the invention is the provision of a gas scrubbing system that can operate advantageously with the employment of kerogen-bearing shale as a sulfur dioxide adsorbing medium, even through such shale has a high sulfur content contributed by both the kerogen and pyrite.

It is also a specific object of the invention to provide an efficient process and apparatus by which titanium oxide can be removed from gases to be emitted into the atmosphere, to permit recovery of its titanium value.

SUMMARY OF THE INVENTION

From a method standpoint, the objects of the invention are achieved by causing an emission gas that is to be scrubbed to flow through a defined mixing zone; at said zone, inducing turbulence in the emission gas while introducing into it an amount of dry, finely comminuted medium for adsorbing pollutant gas, so that said medium is dispersed substantially uniformly through the emission gas, in an amount at least nine times that required for stoichiometric reaction between said medium and the pollutant gas present in the emission gas; maintaining at said zone a temperature high enough for adsorptive chemical reaction between said medium and the pollutant gas; downstream from said zone separating the comminuted medium from the emission gas; and returning to said zone for recycling at least a substantial portion of the comminuted medium that has been separated from the emission gas. For removal of sulfur dioxide from emission gas the comminuted medium is preferably a mineral of the class consisting of limestone and dolomite, having a Blaine Number of at least 4000, rapidly suspension calcined and fed to said zone while still substantially heated from calcining, and fed to said zone at a rate to compensate for the minor portion of separated medium that is not recycled.

From an apparatus standpoint the objects of the invention are achieved with apparatus comprising: a mixing vessel having an outlet and having means by which a flow of emission gas to be scrubbed is introduced into said vessel for tubulent flow at a zone spaced from said outlet; feed means for introducing into the mixing vessel, at said zone, dry, finely comminuted medium for adsorbing pollutant gas, so that said medium is admixed with and dispersed through said emission gas and carried out of said outlet with it; means for maintaining at said zone a temperature sufficiently high to cause said medium to react chemically with, and thus, adsorb, pollutant gas from the emission gas; a gas cleaner at which said comminuted medium is separated from the emission gas, said gas cleaner having an inlet communicated with the outlet of the mixing vessel to receive mixed emission gas and comminuted medium therefrom, a gas outlet and another outlet for comminuted medium; and recirculation means communicating said outlet of the gas cleaner with said zone of the mixing vessel, said recirculation means being arranged to introduce into said zone a substantially major portion of the comminuted medium removed from emission gas at the gas cleaner, for recirculation back through the mixing vessel.

BRIEF DESCRIPTION OF DRAWING

The single FIGURE is a diagrammatic view of apparatus by which sulfur dioxide and similar pollutant gases can be removed from flowing emission gas in accordance with the principles of this invention.

DETAILED DESCRIPTION OF THE INVENTION

Referring now to the accompanying drawing, apparatus embodying the principles of this invention comprises a mixing vessel 5 that has a gas inlet 6 through which gas to be treated is admitted to the vessel, a second inlet 7 for a dry, finely comminuted adsorbing medium, and an outlet 8 through which mixed gas and adsorbing medium pass to a cyclone separator 10. The adsorbing medium inlet 7 is near the gas inlet 6, but the outlet 8 is spaced a substantial distance from both of those inlets.

The gas fed to the inlet 6 may be a stack gas resulting from combustion of, e.g., a high-sulfur fossil fuel or it may be a process gas resulting from a process carried on in a roasting kiln or the like. In any case, it contains gaseous pollutants, and for the sake of illustration it is herein assumed to contain an objectionably high percentage of sulfur dioxide. The gas to be scrubbed is herein referred to as an emission gas because it is to be emitted into the atmosphere after being scrubbed.

The emission gas is brought from the source 4 thereof to the inlet 6 as by way of a duct 9. The inlet 6 is so arranged in relation to the interior of the mixing vessel 5 as to ensure that the gas will have a vigorously turbulent flow in that vessel, at least in a zone 107 that is adjacent to the adsorbing medium inlet 7 and the gas inlet 6. Hence, finely comminuted adsorbing medium will be promptly and uniformly dispersed through the emission gas, owing to its turbulence, and with this dispersed phase fluidization of the medium it is pneumatically transported through the mixing vessel by the emission gas.

The outlet 8 from the mixing vessel is spaced at some distance from its inlets 6 and 7 so that the emission gas and the adsorbing medium will be in contact with one another for some period of time as they pass through the vessel. The vessel 5 should thus be somewhat elongated. Preferably it is substantially cylindrical or tubular and has the gas inlet 6 in its bottom, the adsorbing medium inlet 7 in its side wall near its bottom, and the outlet 8 at its top. Although successful results have been obtained with an elongated horizontally extending vessel, the illustrated vertical orientation is preferred for compactness and because it operates somewhat better in that it provides a longer retention time.

The emission gas inlet 6 is illustrated as a restricted concentric orifice by which the incoming gas flow is substantially accelerated and whereby turbulence is imparted to the gas stream by reason of its abrupt deceleration as it enters the substantially larger diameter interior of the vessel 5. Obviously, suitable baffles or the like could be employed to cause turbulence in the emission gas stream, instead of the orifice arrangement here shown.

The adsorbing medium that is fed into the mixing vessel through the inlet 7 is a finely comminuted dry one containing at least a substantial proportion of an oxide of an alkali earth metal. In most cases the adsorbing medium is preferably lime (CaO) or a substance that contains a substantial amount of lime, particularly if the material to be removed from the emission gas is a pollutant gas such as sulfur dioxide; but the medium could comprise magnesium oxide calcined from dolomite, or a mixture of magnesium and calcium oxides. For purposes of specific example, the adsorbing medium will sometimes be referred to herein as lime powder.

The lime powder can be regarded as entering the mixing vessel 5 by two convergent routes. One of these routes provides for the feeding of freshly calcined lime powder directly to the mixing vessel from a suspension furnace 12 wherein finely comminuted limestone or the like is rapidly calcined as explained hereinafter, by way of a duct 13 which communicates the furnace 12 with the mixing vessel 5. The other route provides for recirculation of lime powder that has already passed through the vessel 5 and has been separated from the emission gas at the cyclone separator 10; and that second route is defined by recirculating means illustrated as comprising a reheater 15, a duct leading from the cyclone 10 to the reheater, and another duct 17 leading from the reheater to the mixing vessel inlet 7. Obviously the inlet 7 could be formed as two separate ports near the bottom of the mixing vessel, one for the new material duct 13 and one for the recirculated material duct 17; or, as shown, the two ducts 13 and 17 can join one another a little upstream from a single port through which they are jointly communicated with the interior of the mixing vessel.

Although the unused lime powder fed to the mixing vessel 5 through the duct 13 can be obtained from any source, and could be calcined in any desired manner, there are several advantages in feeding finely comminuted limestone or the like to the illustrated suspension furnace 12 and then directly feeding the rapidly calcined lime powder to the mixing vessel. By reason of this arrangement the limestone is quickly and controllably calcined at the rate it is needed, in a continuous process. More importantly, the material enters the mixing vessel 5 while still retaining substantially all of the heat imparted to it during the rapid calcining operation, so that at least a substantial part of the energy needed for calcining is conserved to be available for the scrubbing operation itself.

The suspension furnace 12 comprises a generally cylindrical chamber 20 which advantageously has its axis vertical. The lower portion 21 of the chamber 20 is preferably frustoconical or funnel-like, converging downwardly to the duct 13 that leads to the mixing chamber inlet 7. In general, finely comminuted limestone or the like that is fed into the furnace 12 is caused to swirl through the calcining chamber 20 while being rapidly heated therein. Various arrangements for accomplishing such rapid calcining are known or can be readily devised. Successful operation has been achieved with the arrangement shown, wherein heating is principally effected by means of a burner 22, fueled with gas, oil, powdered coat or a mixture of fuels, which is coaxially mounted in the top of the chamber 20 and is arranged to project a flame downward into it. Finely comminuted limestone is fed to the chamber 20 from a supply hopper 24 that is preferably located above it, to provide for gravity flow of the limestone to the suspension furnace by way of a duct 25. A valve 26 in the duct 25 provides for regulation of the rate at which the limestone is fed. At its lower end the duct 25 is bifurcated to communicate with opposite feed inlets 27 which open through the side wall of the chamber 20, near its top, and through which the incoming limestone is directed substantially tangentially into that chamber, to be given a rapid swirling motion around the flame of the burner 22. In the illustrated apparatus, each of the feed inlets 27 is arranged in substantially surrounding relation to a fuel burner 28 that directs a flame towards the calcining chamber 20 in the same tangential direction that the limestone enters it. The burners 28 provide sources of hot combustion gas by which the limestone is carried into the chamber 20, and in this case they are so arranged that their flames do not contact the incoming limestone.

By the heat of the flame and the combustion gases in the calcining chamber 20 the limestone is calcined from calcium carbonate to soft-burned lime (calcium oxide) during the brief time that the material swirls into and downwardly through that chamber along with the combustion gases, and those gases then carry the freshly calcined lime through the duct 13 and into the mixing vessel 5.

It has been demonstrated that the method of this invention can be practiced very satisfactorily with a limestone that contains a substantial amount of sulfur, as is the case with certain shales that have a high-sulfur kerogen content. Apparently the sulfur that is released during calcining by breakdown of the kerogen or other sulfurous component is promptly readsorbed by the calcined material. Kerogen-containing shales, when readily available, can be used to advantage since their kerogen content supplies a portion of the fuel needed for calcining. Kiln waste dust from cement making, usually discarded because of its high alkali content, can also be used as a feed material in a system of the present invention.

The limestone or other feed material must be very finely comminuted in order for it to be calcined during the brief time that it is in the calcining chamber 20 and—more important—to ensure that it will have a large surface area in relation to its volume, for optimum adsorption capacity. It is preferred that 80% to 90% of the feed material be minus 200 mesh. However, since the adsorption reaction apparently occurs only at and near the surfaces of the particles, a more precise specification of the size of the feed material particles is in terms of Blaine Number, which denotes square centimeters of surface area per gram of material; and the preferred Blaine Number is 6,000. Higher Blaine Numbers, if economically attainable, are not in the least objectionable. Blaine Numbers on the order of 4,500 have been found satisfactory, but afford less efficiency than the higher values. The Blaine Number of the material is substantially increased by the calcining operation, but since it is the uncalcined feed material that must be subjected to comminution, the Blaine Number of the material before calcination is herein specified so that the comminution process can be controlled by reference to it.

It will be appreciated that the temperature in the calcining chamber 20 must be so controlled, as by control of the fuel fed to the burner 22 in relation to the rate at which limestone is fed into that chamber, that so-called overburning or dead burning of the material is avoided. As is well known, overburnt lime has closed pores, reduced reactivity, and a tendency to agglomerate. The calcining operation is therefore controlled to produce so-called soft-burned lime. For the purposes of the invention, incomplete calcining is advantageous, for reasons explained hereinafter.

Most of the lime powder that is carried through the mixing vessel 5 with the emission gas is separated from that gas at the cyclone separator 10, which has its inlet 110 communicated with the outlet 8 of the mixing vessel 5. From the gas outlet 210 of the separator 10 the emission gas, along with the remaining powder entrained in it, is conducted by way of a duct 30 to a baghouse 31 or other dust collector at which the gas is drawn through a filter medium by a suction fan 32. Thus cleansed of both gaseous and particulate pollutants, the emission gas is expelled into the atmosphere through the fan 32.

At any given time only a relatively small proportion of the adsorbing medium is passing to the baghouse 31. Therefore, to prevent the system from being overloaded by the continuous admission of fresh medium from the calcining furnace 12, a further portion of the material that has passed through the mixing vessel 5 must be removed or withdrawn from the system. Such withdrawn adsorbing medium can be considered waste or spent material, although it will still have some capacity for adsorbing pollutants, especially since an indeterminate portion of it will have made only one passage through the mixing vessel 5. Nevertheless, a certain portion of the used material must be continuously eliminated from the system in order to make room for continuous introduction of new material that has a higher capacity for pollutant adsorption, to thus maintain the scrubbing effectiveness at a high level.

To provide for continuous elimination of used material, the particulates outlet 310 of the cyclone separator 10, which can comprise a generally conventional air lock seal at the bottom of the cyclone, opens downwardly to a bifurcation having one branch 33 that comprises a waste duct leading vertically down to a waste chamber 34. The other branch of the bifurcation comprises the duct 16 of the recirculation means, which extends obliquely downward. In the vertical waste duct 33, below the bifurcation, there is a rotary device 35 which serves to provide a gas seal between the particulates outlet 310 of the cyclone and the waste chamber 34 but which also permits accumulations of lime powder to gather in the upper portion of the waste duct 33 and to be dumped to the waste chamber 34. By way of example, the device 35 can comprise a screw worm (not shown) coaxial with the duct 33 or operating in a short horizontal duct (not shown) that is communicated at its opposite ends with the cyclone outlet 310 and the waste duct 33, or, as shown, it can comprise a rotating valve with radial vanes somewhat like a water wheel, having its axis transverse to that of the duct.

It will be apparent that a major portion of the lime powder that has passed through the mixing vessel is recirculated back through it from the cyclone 10. It may not be necessary in all cases to include the recirculation heater 15 in the recirculation path. Its purpose is to heat the recirculated material as necessary to maintain a predetermined temperature in the zone 107 of the mixing vessel that is near the inlets 6 and 7, as explained below. The reheater 15 is a substantially cylindrical vessel having its axis vertical and having in its upper portion a tangential inlet 37 for the recirculation material, to which the recirculation duct 16 leads. As shown, a fuel burner 38 is arranged concentrically to the inlet 37 to provide hot combustion gases by which the recirculation material is carried into and through the heating vessel 15 and by which that material is reheated.

If the lime powder fed out of the rapid calcining furnace 12 is not completely calcined, the temperature in the reheater 15 can be maintained at a high enough value to complete the calcining process. This ensures that the recirculated material fed into the zone 107 of the mixing vessel will include a freshly calcined portion that is in the most favorable condition for reaction with sulfur dioxide in the emission gas, and that it is at a high enough temperature for such reaction. Obviously the temperature in the reheater 15 should be kept low enough to avoid overburning the material being recirculated.

For a satisfactory adsorption reaction, the temperature in the inlet end portion of the mixing vessel, at the zone 107, should be kept within a range that is dependent upon the chemical properties, particle size and porosity of the particular material used as the adsorbing medium and has also been found to be dependent upon the carbon dioxide content of the emission gas. Some experimentation may therefore be needed to determine the optimum temperature at the zone 107 for a given set of conditions, but such experimentation need not be burdensome because it can be confined to a relatively narrow range of temperatures and can be guided by considerations and observations pointed out hereinafter. In tests with a shale-like material comminuted to a Blaine Number of about 6,000 and soft-burned, and with emission gas having a carbon dioxide content of about 7%, the optimum temperature range at the zone 107 was found to be 650° C. to 750° C. In other tests, using a more nearly pure limestone, comminuted to about the same Blaine Number and soft-burned, the optimum temperature for adsorption was found to be about 840° C. In the latter test the carbon dioxide content of the emission gas was also 7%, but the mixing vessel was oriented horizontally so that retention time was substantially shorter than with the preferred upright mixing vessel.

It appears that if the emission gas has a high carbon dioxide content, there is a tendency for the lime powder to combine therewith and revert to calcium carbonate, and at certain temperatures the carbon and sulfur reactions tend to compete with one another. In general, therefore, the optimum temperature at the zone 107 is higher with higher percentages of carbon dioxide in the emission gas. In tests using lime as the adsorbing medium, with an emission gas containing about 26% carbon dioxide, temperature at the zone 107 was progressively increased to 740° C., with increased adsorption of sulfur dioxide as the temperature was raised. The tests were terminated, (owing to test equipment limitations) when the 740° C. temperature was attained, and it is believed that the optimum temperature with this carbon dioxide content would be about 800° C.

At temperatures below the optimum range for the particular adsorbing medium and circumstances, the absorbing reaction may not take place to an adequate extent during the time the medium is in contact with the emission gas. At temperatures substantially above the optimum, the medium begins to desorb, that is, a reversal of the adsorbing reaction takes place more or less simultaneously with such adsorption as occurs, so that already-adsorbed sulfur dioxide is released back into the emission gas.

The temperature actually maintained in the mixing vessel inlet zone 107 depends in part upon the temperature of the emission gas entering the mixing vessel and in part upon the rate at which lime powder is fed along the two paths comprising the respective ducts 13 and 17 and the temperature of the powder. Control of temperature at the zone 107 is most readily accomplished by controlling the temperature of the emission gas entering the inlet 6 in the mixing vessel. If the emission gas is too cool, it can be heated, as by means of a fuel burner 43 in the duct 9 that leads to the inlet 6; whereas if the emission gas is too hot, atmospheric air can be bled into it as by means of an air inlet 44 in the duct 9.

To some extent the temperature at the zone 107 can be varied by varying the temperature at the calcining furnace 12 and the rate of flow of combustion gas and calcined material from the calcining furnace to the mixing vessel 5; but the rate of fuel combustion at the calcining furnace should be controlled with primary reference to calcination requirements and the rate of input of feed material from the hopper 24, hence combustion at the furnace 12 should be regarded as a factor which influences temperature at the zone 107 rather than as one that controls it. However, within limits, as pointed out hereinafter, the rate of feed of new material into the system can be controlled for control of the temperature at the zone 107, always provided that the required temperature for a soft-burned calcined product is maintained at the furnace 12.

Another influencing factor, and one that can be utilized for a measure of control of temperature at the zone 107, is the rate at which spent material is dumped to the waste chamber 34, which depends upon the speed of the rotary sealing and valving device 35. Increasing its speed increases the amount of used material sent to the waste chamber 34, thus decreasing the total amount of medium in the system. With the consequent increase in the ratio of new material to total material in the system, the temperature at the zone 107 rises, because at that zone the freshly calcined new material is hotter than the recirculated material. Decreasing the speed of the rotary seal device 35 of course decreases the temperature at the zone 107.

It is important to observe that the reaction between sulfur dioxide and lime powder requires the presence of some free oxygen. Hence, if no oxygen is present in the emission gas, a small amount of air should be introduced into it before it enters the mixing vessel 5.

Because of their high capacity for adsorption, the lime powder particles continue to be useful all during their several passages through the mixing chamber. The material filtered out of the emission gas at the baghouse 31 has been found to be only about 30% saturated; that is, only about 30% of its stoichiometric capacity for chemical reaction with sulfur dioxide has been utilized. In part this is due to the fact that only the smallest particles are carried out of the separator 10 in the emission gas stream flowing to the baghouse 31, and such small particles have large surface area in relation to their bulk. Therefore, especially where incomplete calcining occurs in the calcining furnace 12, material recovered from the baghouse can be advantageously fed back into the system for reuse, as by means of a conveyor denoted by 41 that carries the material from the baghouse to the feed hopper 24. Calcining of such returned medium is completed in a subsequent passage through the calcining furnace 12, and it can thus be reintroduced into the zone 107 of the mixing vessel 5 at the temperature desired for the adsorbing reaction.

The material dumped to the waste chamber 34, being in substantially larger particles than that which passes to the baghouse 31, would have a relatively low adsorption capacity if reused as taken from the waste chamber. However, it could be rather easily reground to reduce its particle size and expose fresh surface areas, thereby increasing its adsorption capacity. Some amount of such reground material could be introduced into the system at the feed hopper 24 along with new feed material. Obviously, only a portion of the material recoverable at the baghouse 31 and/or the waste chamber 34 can be reused, because there must always be a feed of new adsorption medium into the system in order for the adsorption efficacy of the medium in the system to be maintained at a high enough level for satisfactory scrubbing.

According to the invention, the amount of lime powder mixed with emission gas in the mixing vessel 5 at any instant is very substantially in excess of what would be required for a stoichiometric reaction between the lime powder and the sulfur dioxide content of the gas. Therefore the rate of feed of freshly calcined material can be varied for control of temperature at the zone 107, so long as the rate of supply of freshly calcined material is maintained adequate for substantially complete reaction with the sulfur dioxide content of the emission gas. Specifically, with prior systems employing lime as an adsorbing medium for sulfur dioxide, the rate of feed of lime, by weight, was maintained at about one to two times the weight of the sulfur dioxide; whereas with the method and apparatus of the present invention freshly calcined material can be fed into the mixing vessel 5 at such a rate that the ratio of the CaO content of such material to sulfur dioxide, by weight, is on the order of three to one and upwards. The amount of material being recirculated is on the order of three to ten times the amount of freshly calcined material being fed into the system. Thus the recirculated material actually adsorbs a substantial portion of the sulfur dioxide removed from the emission gas. It has been found that an emission gas stream containing 2500 p.p.m. of sulfur dioxide can be cleaned to a level of 310 p.p.m. as measured at the outlet 8 of the mixing vessel, at which no dilution has occurred.

Although there is a relatively large volume of adsorbing medium recirculating in the system, the waste material removed from the baghouse 31 and/or the waste chamber 34 in many cases contains a higher percentage of sulfur than the waste material from prior gas scrubbing systems. This is to say that for removal of a given amount of sulfur, no more adsorbing medium needs to be used than with most prior systems, and there is, correspondingly, no greater amount of waste material to be dumped.

However, an important advantage of the system of this invention is that the waste material produced by it is dry and chemically stable through the range of atmospheric temperatures. It is therefore non-polluting and seems to be well suited for use as an aggregate or bulking agent in asphalt paving mixes and the like.

Although, for conservation of heat energy, it is preferred that the new lime powder fed into the system of this invention be freshly calcined, and that it be rapidly calcined as by means of the suspension furnace 12, it will be apparent that this is not a requirement of the invention. Lime powder from any source can be used, provided that it is of the above-specified small particle size and that the required temperature is maintained in the zone 107 where it enters the mixing vessel 5.

For a more complete understanding of the invention, the following information is given concerning a 24-hour test run on pilot equipment essentially like that illustrated in the accompanying drawing.

EXAMPLE

For the purposes of the test, emission gas was simulated by combustion gases from a natural gas fuel burner into which pure sulfur dioxide gas was injected in the emission gas duct 9, ahead of the gas inlet 6 to the mixing vessel. The rate of injection of sulfur dioxide gas was such as to bring the sulfur dioxide content of gas entering the mixing vessel 5 to a base level of 2500 p.p.m. This base level took account of the sulfur content of coal that was used to fuel the burner 22 of the calcining furnace but did not take account of sulfur present in the adsorption medium.

Natural gas was burned at a rate to generate 300,000 BTU/hr., and 27 to 32 lbs./hr. (12.2–14.5 kg./hr.) of powdered coal (10,500 BTU/lb.) was fed to the calcining furnace 12. To maintain the 2500 p.p.m. $SO_2$ baseline it was necessary to inject 6.4 lbs. per hour (2.9 kg./hr.) of gaseous sulfur dioxide into the simulated emission gas stream. An additional 1.1 lbs./hr. (0.5 kg./hr.) of $SO_2$ was found to be obtained from the adsorbing medium, so that the $SO_2$ content of the gas entering the mixing zone 107 was actually about 2920 p.p.m.

The raw feed to the calcining furnace 12 was kenogen-bearing Colorado shale found to have the following analysis:

| | |
|---|---|
| CaO content (as CaO) | 44.1% |
| SiO | 9.2 |
| $Al_2O_3$ | 3.0 |
| $Fe_2O_3$ | 1.2 |
| MgO | 0.5 |
| $SO_3$ | 2.2 |
| Alkalis ($K_2O$, $Na_2O$) | 1.2 |
| L.O.I. (i.e., materials lost on ignition - $CO_2$ and kerogen) | 38.5 |
| | 99.9 |

The gas passing through the mixing vessel 5 had a 7.2% to 7.3% $CO_2$ content, derived from the combustion gas employed for simulation of emission gas, from fuel burned for calcining, and by release from the adsorption medium in calcining. Oxygen content of the gas through the mixing vessel was 8.0%.

During the 24-hour period of the test run, temperatures at the following specified locations were found by periodic measurement to range between the values set forth:

| | |
|---|---|
| In the calcining vessel 20 | 890°–960° C. |
| At the wing burners 28 of the calcining furnace | 420°–450° |
| In the mixing zone 107 | 560°–590° |
| At the outlet 8 from the mixing vessel | 520°–540° |
| In the duct 9 ahead of the emission gas inlet 6 | 840°–860° |
| In the reheater 15 | 440°–460° |

It should be noted that the thermal insulation of the pilot plant, although adequate for test purposes, would have been unsatisfactory for efficient gas scrubbing in actual operation, and heat losses due to insulation deficiencies are reflected in some of the above temperature values. With completely satisfactory insulation, there would probably have no need to use the reheater 15.

During the test period, the rate at which new shale material was fed into the system was measured on the basis of the CaO content of the feed material and was 26.9 lbs./hr. (12.2 kg./hr.). The feed material was comminuted to a Blaine Number of 6100. Discharge of material to the waste chamber 34 was at the rate of 32 lbs./hr. (14.5 kg./hr.), and material was discharged to the baghouse 31 at the rate of 20.5 lbs./hr. (9.3 kg./hr.).

It must be borne in mind that the weight of discharge material includes both the weight of sulfur dioxide adsorbed by the medium and that of fly ash from combusted coal (at the rate of 1 to 1.2 kg. per hour) which was separated from the gas stream along with the adsorption medium.

The amount of adsorbing medium constantly in the system as a recirculating load was 160 to 185 lbs. (72.6 to 83.9 kg.) which in this example is equal to approximately 15.5 to 17.8 times that needed for stoichiometric reaction. The ratio of CaO content of fresh feed material to $SO_2$ content of the simulated emission gas was 4.2 times that needed for stoichiometric reaction.

In the apparatus used for these tests vessel 5 was 27 feet in height, with an internal diameter of 10.5 in., and gas was drawn therethrough at a velocity which conveyed adsorbing medium therethrough (a minimum of 30 ft./sec.).

At the gas outlet 210 of the cyclone 10, at a location where no dilution of the scrubbed emission gas has occurred, the $SO_2$ content of the emission gas was found to be 380 p.p.m., measured with an accuracy of ±30 p.p.m. On the basis of the nominal 380 p.p.m. value and the 2500 p.p.m. base line value, the system was removing 85% of the sulfur content of the emission gas.

For removal of sulfur and phosphorous gases from emission gases, lime (calcium oxide) will naturally be the preferred adsorbing medium, due to its low cost and availability; but where, for example, titanium oxide is to be recovered from emission gas, it may be desirable to use an oxide of one of the other alkali earth metals, as to take advantage of special properties of such adsorbing medium in its combination with the recovered or adsorbed material.

The embodiments of the invention in which an exclusive property or privilege is claimed are defined as follows:

1. A method of scrubbing a flowing emission gas to remove therefrom pollutant gaseous sulfur dioxide said method being characterized by:
   (a) feeding (e.g. at 7) a fresh dry finely divided pollutant adsorbing medium (e.g. from 13) into a defined mixing zone (107);
   (b) injecting the emission gas into said mixing zone (107) and producing turbulent flow of said gas through said zone (as by 6) to mix the emission gas (in 107) with the fresh medium (from 7);
   (c) conducting said emission gas and admixed medium away from said mixing zone (107) along a defined first path (107, 5, 8) to a location at which said medium and pollutant adsorbed by said medium is separated from said emission gas (e.g. at 10);
   (d) recirculating a major portion of the separated medium (from 10) along a second path (10, 16, 17) back to said mixing zone (107) to provide a closed loop recirculation path (107, 5, 8, 10, 16, 17, 107) for recirculating medium;
   (e) removing a minor portion of said medium (e.g. at 34) from the recirculation path while continuing to circulate said major portion around the recirculation path (107, 5, 8, 10, 16, 17, 107);
   (f) controlling the rate of removal of medium (as by 35) from the recirculation path (at 34) and the rate medium is injected (at 7) to said mixing zone (107) to remove and replace a minor portion of the circulating medium and to deliver medium to said mixing zone (107) comprising recircultated medium (from 17) plus fresh medium (from 13), in amounts that together total at least about nine times that required for stoichiometric adsorbtive chemical reaction between said medium and the pollutant present in the emission gas;

(g) heating said medium out of contact with the emission gas (at 12 or 15) prior to feeding said medium into said mixing zone (107); and (h) controlling said heating of said medium (by e.g. 26, 28 at 12 and/or 35, 38 at 15) to admit said medium to mixing zone 107 at a temperature high enough for adsorbtive chemical reaction between said medium and said pollutant gas.

2. A method of scrubbing a flowing emission gas to remove therefrom pollutant gaseous sulfur dioxide, said method being characterized by:

(a) producing a fresh hot dry pollutant adsorbing medium by subjecting (e.g. at 20) finely divided material containing a substantial portion of a carbonate of the class consisting of calcium and magnesium carbonates to heat of a burner flame (22) while suspending said material in flowing hot combustion gases of said burner flame, to rapdily calcine said material to a soft burned product medium;

(b) feeding said fresh medium (e.g. through 13) while it retains a substantial amount of the heat imparted to it by such calcining, to a defined mixing zone (107);

(c) injecting said emission gas into said mixing zone (107) and producing turbulent flow of said gas through said zone (as by 6) to mix the emission gas (in 107) with the fresh hot soft burned medium (from 13);

(d) conducting said emission gas and admixed hot medium away from said mixing zone (107) along a defined first path (107, 5, 8) to a location at which said medium and pollutant adsorbed by said medium, is separated from said emission gas (e.g. at 10);

(e) recirculating a major portion of the separated medium (from 10) along a second path (10,16, 17) to said mixing zone (107), thus providing a closed loop recirculation path (107, 5, 8, 10, 16, 17, 107) for recirculating medium;

(f) removing a minor portion of said medium (e.g. at 34) from the recirculation path while continuing to circulate said major portion around the recirculation path (107, 5, 8, 10, 16, 17, 107); and (g) controlling the rate of removal of medium (as by 35) from the recirculation path (at 34) and the rate fresh hot medium is injected (at 7) to said mixing zone (107) to remove and replace a minor portion of the circulating medium and to deliver medium to said mixing zone (107) comprising recirculated medium (from 17) plus fresh hot medium (from 13), in amounts that together total at least about nine times that required for stoichiometric adsorbtive chemical reaction between said medium and the pollutant present in the emission gas and said hot medium maintains at said mixing zone (107) a temperature high enough for adsorbtive chemical reaction between said medium and said pollutant.

3. The method of claim 2, further characterized by: controlling the rate at which hot freshly calcined material (e.g. from 20) is fed into said zone (107) by controlling the rate (as by valve 26) at which uncalcined material is brought to exposure to heat (e.g. at 20) for calcining.

4. The method of claim 2, further characterized by: controlling the temperature at said zone (107) by controlling the rate at which said minor portion of medium is removed (as at 35) from the recirculation path (5, 10, 16, 17).

5. The method of claim 2, further characterized by: controlling the temperature at said mixing zone (107) by subjecting the medium that has been separated from the emission gas and is being returned to the mixing zone (107) along said second path (10, 16, 17), to heat of a burner flame (at 37, 38, 15), before said medium arrives back at the mixing zone (107).

6. The method of claim 2, further characterized by: feeding hot fresh calcined material (as from 13) into said zone (107) at substantially the rate at which said minor portion of the medium is removed from the recirculation path (5, 10, 16, 17).

7. The method of claim 1, further characterized by the Blaine Number of said finely divided material being not substantially below 4500.

8. The method of claim 1 wherein said medium is calcined material of the class consisting of dolomite and limestone comminuted to a fineness such that its Blaine Number is at least 4000.

9. The method of claim 2 wherein the hot fresh medium is fed (through 13) to the mixing zone (107) in an amount equal to at least three times that required for stoichiometric adsorbtive chemical reaction between said medium and pollutant present in the emission gas passing through said mixing zone (107).

10. The method of claim 1 wherein the rate of removal of medium (as by 35) from the recirculation path at (34) and the rate fresh medium is fed (as by 26, 13) into mixing zone (107) to replace removed medium, is controlled so that the medium in the mixing zone (107) comprising recirculated medium (from 17) plus fresh medium (from 13) totals an amount which is between nine and forty times that required for stoichiometric adsorbing chemical reaction between the medium and the pollutant present in the emission gas.

* * * * *